US011463900B2

(12) United States Patent
Zhu et al.

(10) Patent No.: US 11,463,900 B2
(45) Date of Patent: Oct. 4, 2022

(54) SYSTEMS AND METHODS FOR APPLICATION-ANONYMOUS RULE AUTHORIZATION AND ENFORCEMENT IN A WIRELESS NETWORK

(71) Applicant: Verizon Patent and Licensing Inc., Basking Ridge, NJ (US)

(72) Inventors: Lily Zhu, Parsippany, NJ (US); Deepa Jagannatha, Bridgewater, NJ (US); Bharadwaj Vemuri, Bear, DE (US); Brian T. Mecum, Aliso Viejo, CA (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/194,279

(22) Filed: Mar. 7, 2021

(65) Prior Publication Data

US 2022/0286891 A1   Sep. 8, 2022

(51) Int. Cl.
*H04W 28/02* (2009.01)

(52) U.S. Cl.
CPC .............................. *H04W 28/0215* (2013.01)

(58) Field of Classification Search
CPC ......... H04W 28/0215; H04W 28/0268; H04W 28/00; H04W 4/00; H04W 4/70; H04W 72/08

See application file for complete search history.

(56) References Cited

U.S. PATENT DOCUMENTS

| 2017/0289046 | A1* | 10/2017 | Faccin | H04L 47/805 |
| 2019/0053104 | A1* | 2/2019 | Qiao | H04L 47/20 |
| 2021/0144790 | A1* | 5/2021 | Faccin | H04W 60/00 |
| 2021/0204164 | A1* | 7/2021 | Yavuz | H04L 47/781 |
| 2022/0014566 | A1* | 1/2022 | Guim Bernat | H04L 63/205 |
| 2022/0039004 | A1* | 2/2022 | Soliman | H04W 8/18 |

FOREIGN PATENT DOCUMENTS

WO    WO-2017218775 A1 * 12/2017 ............ H04W 12/06

* cited by examiner

*Primary Examiner* — Stephen J Clawson

(57) ABSTRACT

A system described herein may provide a technique for applying an authorized set of traffic parameters, such as network slicing parameters, Quality of Service ("QoS") parameters, etc. to traffic associated with a particular application, without exposing an identifier of the traffic to one or more network devices of a network that handles the traffic. An authentication system of some embodiments may generate a tokenized version of the application. A User Equipment ("UE") may extract a token from the tokenized application and identify a set of traffic parameters based on then token. The UE may apply the traffic parameters to outbound traffic associated with the application, and the network may determine whether such traffic parameters are authorized for a destination associated with the traffic based on an authorization of the destination for the particular traffic parameters.

20 Claims, 12 Drawing Sheets

| Token | SSP |
|---|---|
| Token_A | SSP_A |
| Token_B | SSP_B |
| Token_C | SSP_C |
| Token_D | SSP_A |

SYSTEMS AND METHODS FOR APPLICATION-ANONYMOUS RULE AUTHORIZATION AND ENFORCEMENT IN A WIRELESS NETWORK

BACKGROUND

Wireless networks may be used for the wireless transmission of various applications and/or types of traffic, such as voice call traffic, messaging traffic, audio and/or video streaming traffic, file download traffic, and/or other types of traffic. Different applications may have different Quality of Service ("QoS") requirements, routing rules, or the like. For example, voice call traffic may have lower latency requirements than file download traffic, and file download traffic may have higher throughput requirements than voice call traffic.

DETAILED DESCRIPTION OF EXAMPLE EMBODIMENTS

The following detailed description refers to the accompanying drawings. The same reference numbers in different drawings may identify the same or similar elements.

Different applications and/or traffic types, of traffic that is handled via a wireless network, may have different Quality of Service ("QoS") requirements, routing rules, or the like. Embodiments described herein provide for the determination and enforcement of such QoS requirements, routing rules, etc. for particular traffic types by a wireless network, without requiring exposure of a particular application or traffic type for which such QoS requirements, routing rules, etc. are to be applied. As such, the privacy of users may be preserved, as data pertaining to the usage of particular applications, traffic types, etc. by a given user need not be determined in order for such applications, traffic types, etc. to be handled properly (e.g., to provide QoS treatment, implement routing rules, etc.) by a network, in accordance with embodiments described herein.

Figure 1:
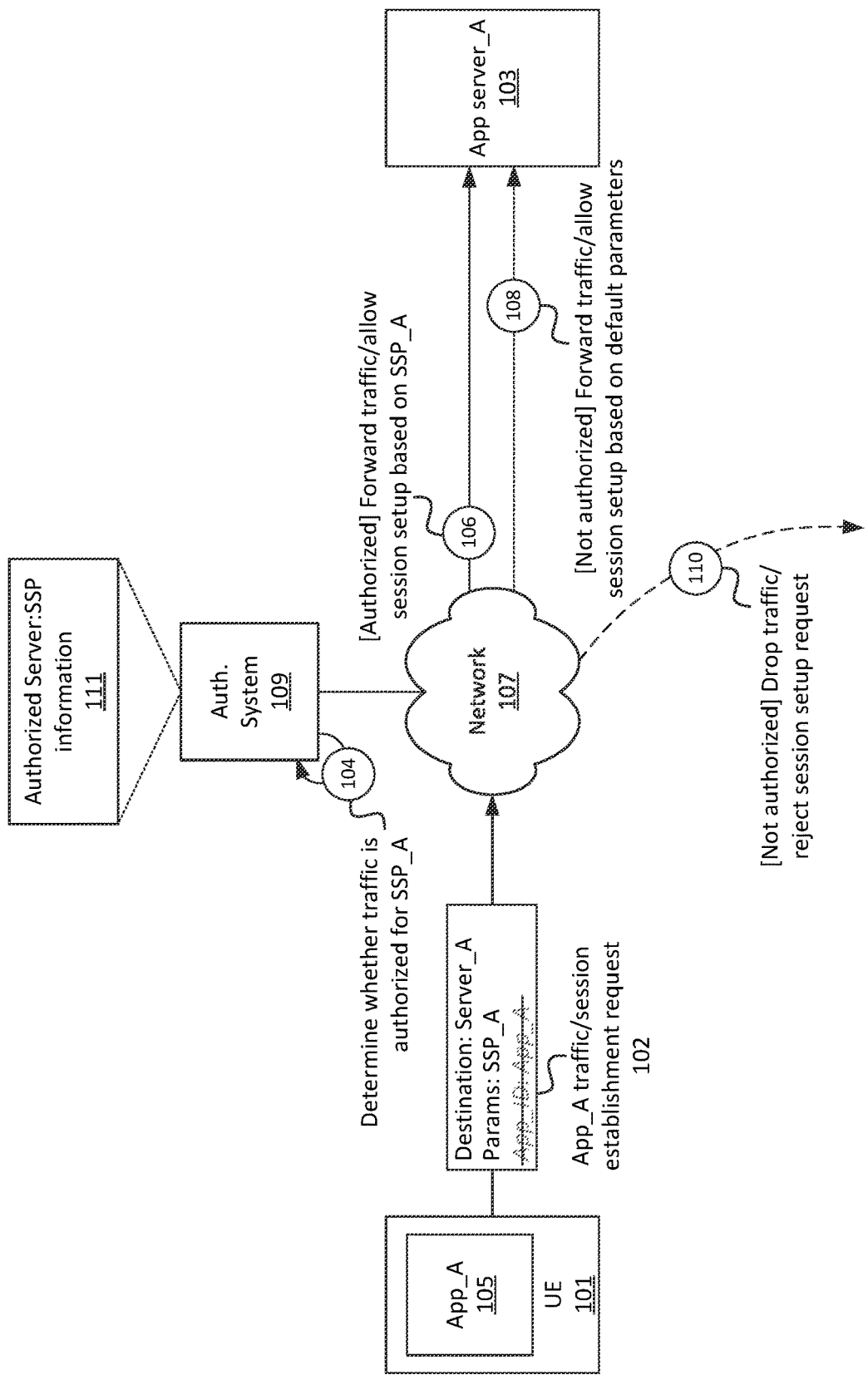
FIG. 1 illustrates an example overview of one or more embodiments described herein.

As shown in FIG. 1, for example, User Equipment ("UE") 101, such as a mobile telephone, a tablet device, or the like, may output (at 102) traffic toward application server 103, which may be an application server, a web server, a content streaming system, and/or some other network-accessible resource. In the example shown here, application server 103 is a particular application server (referred to as "App server_A"), which may be distinct from other application servers 103. For example, different application servers 103 may have different identifiers, addresses (e.g., Internet Protocol ("IP") addresses, Uniform Resource Locators ("URLs"), or the like).

In some embodiments, application server 103 may be a "server-side" resource associated with an application executing at UE 101, such as application 105. For example, application 105 may execute operations relating to input (e.g., receiving user input such as haptic input, voice input, camera input, etc.) and/or output (e.g., visual output, audible output, haptic output, etc.) associated with a given application (e.g., a gaming application, a content streaming application, a voice call application, etc.) via UE 101. Application 105 may further communicate (e.g., via network 107) with application server 103 in order to provide traffic relating to received input to application server 103, and to receive traffic from application server 103 relating to output to be presented by UE 101. In the example shown here, application 105 is a particular application (referred to as "App_A"), which may be distinct from other applications 105. Different applications 105 may communicate with different application servers 103, and/or multiple different applications 105 may communicate with the same application server 103 (e.g., the same application server 103 may host multiple applications).

Application server 103 may perform computations and/or other operations based on input received from UE 101 (e.g., from application 105) and/or from one or more other sources. For example, application server 103 may execute "back end" functionality for a gaming application, a video streaming application, an augmented reality ("AR") application, etc., and may provide traffic to UE 101 (e.g., to application 105) based on such computations and/or other operations. In this sense, application 105 may be a "client-side" resource of a client-server application executed in conjunction with application server 103.

The traffic (output at 102) may include uplink traffic (e.g., traffic destined for application server 103), a session establishment request (e.g., a protocol data unit ("PDU") session establishment request, an IP session establishment request, and/or some other sort of session or connection establishment request). In accordance with embodiments described herein, and as indicated in the figure by the strikethrough text, the traffic may not include an identifier of application 105. For example, omitting the identifier of application 105 may prevent network 107 and/or some other device or system from tracking usage data associated with UE 101, indicating that UE 101 is sending and/or receiving traffic related to application 105 in particular.

In accordance with embodiments described herein, and as described further below, the traffic (output at 102) may include an indication that the traffic is destined for application server 103, and may further include one or more traffic parameters. In some embodiments, the traffic parameters may include a Slicing Service Profile ("SSP"), which may include a requested network slice for the traffic and/or for a session or flow associated with UE 101 and application server 103 (e.g., associated with traffic generated by and/or otherwise associated with application 105). A "network slice" may refer to a discrete set of resources, devices, systems, Virtualized Network Functions ("VNFs"), etc. associated with network 107, where different slices provide differentiated levels of service. For example, one particular slice may provide relatively low latency communications and relatively low throughput, another slice may provide relatively high latency communications and relatively high throughput, yet another slice may provide relatively low latency communications and relatively high throughput, and so on. In some embodiments, the traffic parameters and/or the SSP may include one or more other parameters, such as a requested QoS level, one or more Service Level Agreements ("SLAs"), routing rules, a Data Network Name ("DNN"), and/or other parameters relating to the routing, prioritization, and/or QoS of the traffic.

The parameters included in the traffic (output at 102) may have been authenticated and/or authorized in, accordance with embodiments described herein, prior to the output (at 102) of the traffic. For example, as discussed below, application 105 may have already been authorized, by one or more devices or systems associated with network 107 (e.g., by authentication system 109), for the requested parameters. As further described below, application server 103 (e.g., a "server-side" resource with respect to application 105) may have also been authorized (e.g., by authentication system 109) for the requested parameters.

As such, network 107 may determine (at 104) whether the traffic (output at 102) is authorized for the requested parameters. For example, authentication system 109 and/or some other device or system associated with network 107 may maintain server-to-SSP information 111, indicating particular SSPs (or other traffic parameters) that have been authorized for particular resources (e.g., application servers, content provider systems, etc.). As discussed below, server-to-SSP information 111 may be determined or generated as part of an "onboarding" process or other suitable process, in which authentication system 109 authenticates or authorizes particular applications and/or other resources for particular traffic parameters. In this example, authentication system 109 may determine (at 104) whether application server 103 is authorized for the requested SSP indicated in the traffic (output at 102) based on server-to-SSP information 111.

In this manner, since application 105 has previously been authorized for the requested SSP (and this authorization may be maintained and/or verified by an operating system, SIM ("Subscriber Identification Module"), and/or other component of UE 101), and further since application server 103 has previously been authorized for the requested SSP (and this authorization may be maintained and/or verified by authentication system 109), the SSP requested in the traffic may be verified by authentication system 109 without requiring that authentication system 109 identify the particular application (e.g., application 105) with which the traffic is associated. As such, anonymity of application 105 and the privacy of a user of UE 101 may be preserved, while also allowing traffic associated with application 105 to be sent and/or received via network 107 in accordance with suitable traffic parameters.

Assuming that authentication system 109 determines that the traffic (output at 102) is authorized for the requested parameters (e.g., based on server-to-SSP information 111), network 107 may allow (at 106) the traffic to be forwarded, may perform or facilitate the establishment of one or more sessions between UE 101 and application server 103, may assign the traffic and/or session to a particular flow identifier and/or network slice, and/or may otherwise route the traffic to application server 103 in accordance with the requested traffic parameters.

In situations where authentication system 109 determines that the traffic (output at 102) is not authorized for the requested parameters, network 107 may still allow (at 108) the forwarding of the traffic to application server 103, the establishment of one or more sessions or flows between UE 101 and application server 103, or the like, but with different parameters than the requested parameters. For example, authentication system 109 may assign a "default" set of parameters or other set of parameters to the traffic. For example, the "default" set of parameters may include a "default" network slice, a "default" QoS level, or the like. Additionally, or alternatively, when determining that the traffic is not authorized for the requested parameters, authentication system 109 may cause (at 110) the traffic to be dropped (e.g., not forwarded to application server 103) and/or may cause a session establishment request to be rejected. In some embodiments, such dropping and/or rejecting (at 110) may include outputting a notification (e.g., a rejection notification, a non-acknowledgement ("NACK") notification, etc.) to UE 101, indicating that the traffic was not forwarded and/or that a requested session was not established. In this manner, requests for unauthorized traffic parameters may be rejected, thus preserving the efficient operation of network 107.

Figure 2:
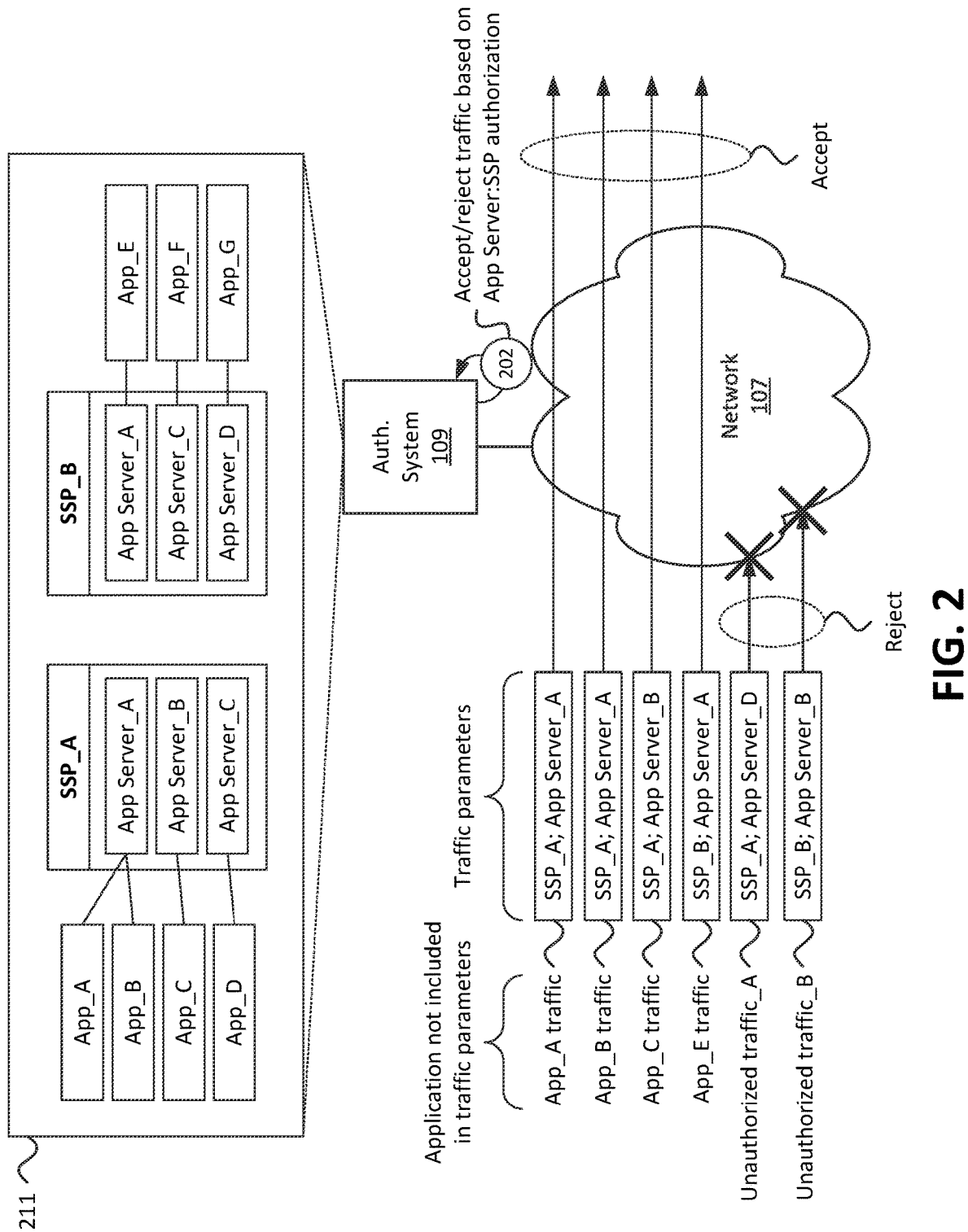
FIG. 2 illustrates an example of application-anonymous authorization and/or denial of traffic, in accordance with some embodiments.

FIG. 2 illustrates an example of application-anonymous authorization and/or denial of traffic associated with different applications and/or UEs, with particular requested traffic parameters, in accordance with some embodiments. For example, as shown, network 107 may receive various traffic and/or requests (e.g., session establishment requests and/or other requests) associated with different applications. The traffic may include traffic from a first application (e.g., "App_A traffic"), traffic from a second application (e.g., "App_B traffic"), and so on. The traffic may also include unauthorized traffic, which will be discussed below.

The traffic may be received from one particular UE 101, and/or from a group of UEs 101. For the sake of example, assume that each traffic is received from one particular UE 101. As shown, the traffic may include traffic parameters, such as a particular SSP (e.g., a requested SSP, which may include a requested network slice, a requested QoS level, a requested routing policy, etc.) and an indication of a particular destination (e.g., an IP address, a URL, a Fully Qualified Domain Name ("FQDN"), and/or some other indicator of the destination of the traffic and/or an endpoint with which to establish a session, such as a PDU session, an IP session, or the like).

For example, as shown, the App_A traffic may include a first requested SSP ("e.g., SSP_A") and a first destination (e.g., "App Server_A"), the App_B traffic may include a request for SSP_A and an indication of App Server_A as the destination, the App_C traffic may include a request for SSP_A and indication of App Server_B as the destination, and the App_E traffic may include a request for SSP_B and an indication of App Server_A as the destination. The first unauthorized traffic (e.g., "Unauthorized traffic_A") may include a request for SSP_A and an indication of App Server_D as the destination, and Unauthorized traffic_B may include a request for SSP_B and an indication of App Server_B as the destination. While shown as being associated with a given application (e.g., App_A traffic associated with an application referred to as "App_A," App_B traffic associated with an application referred to as "App_B," and so on), as mentioned above, the traffic may not itself include an actual identifier of the application. Additionally, or alternatively, the traffic may include an encrypted value, a hashed value, a fingerprint, or an otherwise secret or secure value that includes and/or is derived from an application identifier of the respective application with which the traffic is associated. Such value may be "secret" or "secure" inasmuch as network 107 and/or authentication system 109 may not possess a decryption key or other mechanism by which to ascertain such application identifier.

For the purposes of this example, assume that the traffic does not include an identifier of the respective application with which the traffic is associated. In some embodiments, the received traffic may include one or more data packets, a session establishment request, or other traffic related to (e.g., generated by) particular applications executing on one or more respective UEs 101.

As shown, authentication system 109 may accept and/or reject (at 202) the respective traffic based on comparing attributes or parameters of the traffic to authorization information 211. For example, as discussed above, authentication system 109 may "accept" the traffic by routing the traffic toward its respective destination using the requested parameters (e.g., the requested SSP), facilitating the establishment of one or more respective sessions using the requested parameters, indicating authorization of the traffic to one or more devices or systems of authentication system 109 (e.g., a Session Management Function ("SMF"), a Packet Data Network ("PDN") Gateway Control function ("PGW-C"), and/or some other device or system), and/or otherwise allowing the traffic to traverse network 107 using the requested parameters associated with the traffic. On the other hand, as discussed above, "rejecting" the traffic may include dropping the traffic and/or allowing the traffic to traverse network 107 using different parameters than the requested parameters (e.g., "default" parameters or other parameters).

As shown, authentication system 109 may maintain authorization information 211, indicating particular SSPs for which particular application servers 103 are associated. For example, authorization information 211 may indicate that App Server_A is authorized for SSP_A and SSP_B, that App Server_B is authorized for SSP_A, that App Server_C is authorized for SSP_A and SSP_B, and that App Server_D is authorized for SSP_B. In some embodiments, authorization information 211 may further include information regarding particular applications associated with particular application servers 103. For example, as shown, authorization information 211 may indicate that App_A, App_B, and App_E are associated with App Server_A, that App_C is associated with App Server_B, and so on. The information indicated by authorization information 211 may be provided and/or determined during an onboarding process, as discussed below, in which authentication system 109 may receive or otherwise determine that particular applications and/or application servers 103 are authorized for particular SSPs.

While authentication system 109 may in some embodiments maintain information associated with particular applications, such information may not be used during the determination (at 202) of whether particular traffic should be accepted and/or rejected. For example, the determination (at 202) may be based on a requested SSP and traffic destination, but not based on an identifier of any particular application. In some embodiments, one or more other factors may be used in the determination (at 202), such as an identifier of a particular UE 101 from which the traffic was received, a geographical location of UE 101, a particular radio access technology ("RAT") via which UE 101 is connected to a RAN, and/or other factors. In some such embodiments, authentication system 109 may maintain (e.g., in authorization information 211 and/or via some other mechanism) information based on which such determination may be made based on these other factors. For example, in this manner, the authorization of whether particular traffic should be authorized for a requested SSP may further be based on other factors, where such other factors may be separate from and/or may not include an application identifier.

As discussed below, authentication system 109 may use the information associating particular applications to particular application servers 103 in order to authenticate such applications when these applications are provided (e.g., for installation) to one or more UEs 101. In some embodiments, the information identifying particular applications may include an application identifier, an application fingerprint, a hashed value or some other value derived from the application identifier and/or an installation package associated with the application, a randomly generated value, and/or some other unique identifier.

Figure 3:
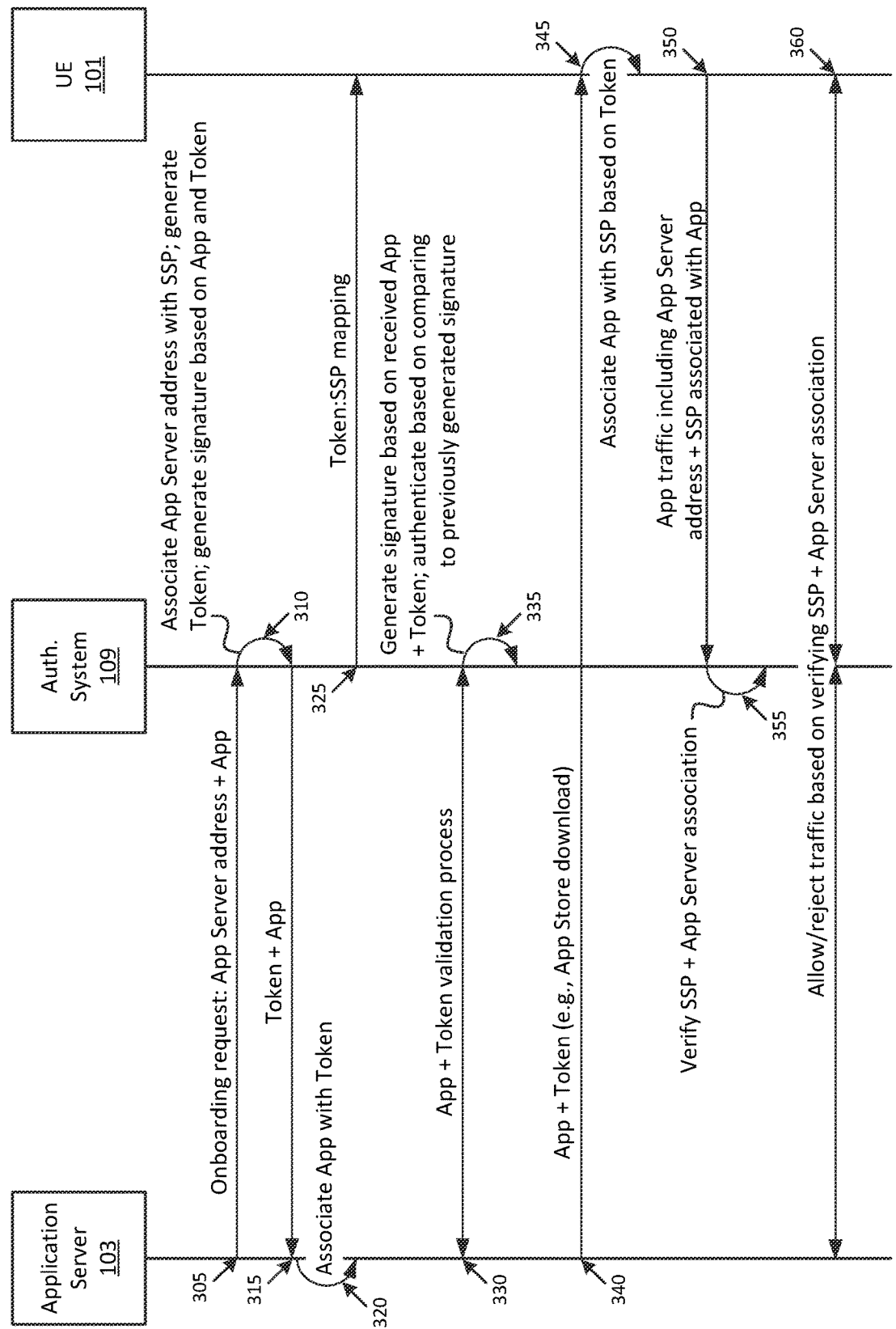
FIG. 3 illustrates an example signal flow that may be used to securely provide for application-specific traffic treatment, in accordance with some embodiments.

FIG. 3 illustrates an example signal flow that may be used to securely provide for application-specific traffic treatment without exposing an application identifier to network 107. As shown, for example, application server 103 may output (at 305) an onboarding request to authentication system 109. The request may be output via an application programming interface ("API"), a portal, and/or some other suitable communication pathway. The onboarding request may include an identifier or address associated with application server 103 (e.g., an IP address, a URL, an FQDN, etc.), as well as a particular application or information associated with an application. For example, authentication system 109 may receive an application installation package associated with the application, an executable file or set of files associated with the application, an application identifier, and/or some other information associated with or derived from the application.

In some embodiments, in lieu of an explicit onboarding request from application server 103, authentication system 109 may identify a particular application or set of applications for which particular traffic treatment is to be provided. For example, authentication system 109 may receive an indication from some other device or system of particular applications or application servers for which a particular set of rules, routing policies, QoS levels, etc. are to be applied.

While not described at length here, authentication system 109 may perform any suitable authentication and/or authorization process to determine that the application (indicated at 305) is associated with a particular SSP or other traffic parameters. For example, authentication system 109 may receive or maintain information associating particular applications, types of applications, particular application servers, etc. with particular SSPs or other traffic parameters. Based on such authentication and/or authorization, authentication system 109 may store (at 310) information indicating that application server 103 is authorized for a particular SSP. For example, authentication system 109 may store an association between an address of application server 103 and a particular SSP (e.g., as similarly discussed above with respect to authorization information 211). Authentication system 109 may further generate a token associated with the particular SSP, and/or may select a token from a pool of tokens (e.g., where each token of the pool of tokens is associated with a respective SSP). The token may be and/or may include, for example, an alphanumeric string, a random or pseudorandom value, and/or some other type of suitable information.

In some embodiments, authentication system 109 may maintain information indicating that the token is associated with the application. For example, the application itself (e.g., an application install package, an application executable, etc.) may be unmodified, while authentication system 109 maintains suitable correlation information indicating that the application is associated with the selected or generated token. Additionally, or alternatively, authentication system 109 may regenerate, recompile, etc. the application (e.g., the application installation package, the application executable file(s), etc.) to include the token and/or information from which the token may be derived.

Further, authentication system 109 may generate a signature that is unique to the particular application and the token. For example, authentication system 109 may perform a cryptographic hashing function and/or some other suitable function on the received application. For example, such function may be performed an on application installation package, an application identifier, and/or other information associated with the application. In some embodiments, the signature may further be based on the token. For example, as noted above, authentication system 109 may, in some embodiments, regenerate, recompile, etc. the application to include the token; in such embodiments, the hashing function or other suitable function performed on the regenerated or recompiled application may therefore be based on the application and the token. Additionally, or alternatively, in embodiments where the application is not regenerated or recompiled, the hashing function or other suitable function may take the application and the token as inputs, and generate the signature based on these separate inputs.

Authentication system 109 may output (at 315) the generated or selected token to application server 103. For example, authentication system 109 may indicate a successful validation of the application, and may provide the token to application server 103. In embodiments where authentication system 109 regenerates, recompiles, etc. (at 310) the application, authentication system 109 may provide the token and the application as a unified application install package, application executable file(s), etc. In embodiments where authentication system 109 does not regenerate, recompile, etc. (at 310) the application, authentication system 109 may provide the token with an application identifier or other suitable information based on which application server 103 may associate (at 320) the application with the separately provided token.

Figures 4, 5:
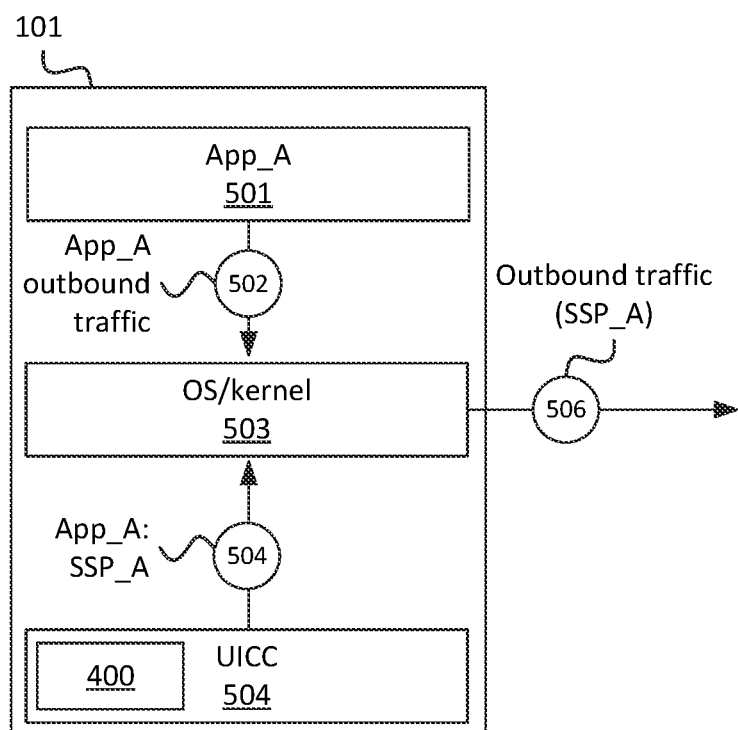
FIG. 4 illustrates an example data structure that may represent a particular token-to-SSP mapping, in accordance with some embodiments.
FIG. 5 illustrates an example signal flow that may be used to request particular traffic parameters for a given application, in accordance with some embodiments.

As further shown, authentication system 109 may provide (at 325) a token-to-SSP mapping to one or more UEs, such as a particular UE 101. FIG. 4 illustrates an example data structure 400 that may represent a particular token-to-SSP mapping. For example, as shown, a set of tokens (Token_A, Token_B, Token_C, and Token_D) may each be associated with a particular SSP. For example, Token_A may be associated with SSP_A, Token_B may be associated with SSP_B, Token_C may be associated with SSP_C, and Token_D may be associated with SSP_A. That is, in some embodiments, multiple tokens may be associated with the same SSP. For example, situations may arise where different tokens are generated (e.g., at 310) for the same application, and/or for different applications for which the same SSP is to be applied.

Returning to FIG. 3, authentication system 109 may provide (at 325) the token-to-SSP mapping (e.g., as reflected in data structure 400 and/or a portion thereof) to UE 101 as part of an Over-the-Air ("OTA") update process, as part of a provisioning process, based on a request from UE 101 (e.g., after UE 101 downloads and/or executes the application, after UE 101 accesses an "app store" or other repository from which the application may be obtained, or the like), and/or at some other time. In some embodiments, authentication system 109 may provide (at 325) the mapping based on selecting and/or generating (at 310) the token for the application, while in some embodiments authentication system 109 may provide the mapping prior to selecting the token for the application. That is, in some embodiments, the mapping may be "pushed" to UE 101 (e.g., without a request from UE 101, and/or independent of any such requests from UE 101) by authentication system 109 and/or may be "pulled" by UE 101 from authentication system 109. As discussed below, this mapping may be used by UE 101 to request particular SSPs that have been authorized (e.g., at 310) for particular applications. In some embodiments, UE 101 may store the mapping in a SIM ("Subscriber Identification Module") card, a Universal Integrated Circuit Card ("UICC"), and/or some other secure storage (e.g., where such storage is "secure" inasmuch as the mapping may not be modified and/or accessed by applications installed on or executing at UE 101)

Application server 103 and authentication system 109 may further perform (at 330) a validation process of the application with the token (e.g., as provided at 315). For example, application server 103 may periodically and/or intermittently provide the application and the token (e.g., the application regenerated and/or recompiled with the token, and/or the application with the token separately) for validation by authentication system 109. Additionally, or alternatively, authentication system 109 may obtain the application and token from application server 103 and/or from a repository from which the application may be obtained (e.g., an "app store" and/or some other suitable resource). Authentication system 109 may verify (at 335) that the application and token, as provided by application server 103 and/or other suitable resource (e.g., an "app store") match the previously authorized (at 310) parameters for the application. In this manner, authentication system 109 may verify that a different application has not been associated (by application server 103) with the authorized SSP, and/or that a different SSP has not been associated with the application. That is, authentication system 109 may verify that the application, available for download to UE 101, is provided with the authorized parameters and not with other parameters.

For example, authentication system 109 may generate (at 335) a signature based on the obtained (at 330) application and token. This signature may be generated in the same manner (e.g., using the same function or functions) as the previously generated (at 310) signature. Authentication system 109 may compare the generated (at 335) signature to the previously generated (at 310) signature. If these signatures match, authentication system 109 may authenticate the application and token, as provided (at 330) by application server 103. If, on the other hand, these signatures do not match, authentication system 109 may revoke an authorization for the particular SSP (identified at 310) for application server 103. For example, authentication system 109 may remove an association between application server 103 (e.g., an address of application server 103) and the SSP. Additionally, or alternatively, authentication system 109 may cause the application to be removed from the resource from which the application was obtained (at 330), may notify application server 103 that the authorization of application server 103 to utilize the SSP has been revoked, may notify application server 103 that the token for the application does not match an authorized token, or perform other suitable operations.

Assuming that the application and token have been validated (at 335), UE 101 may at some point receive (at 340) the application and token from application server 103 and/or some other suitable resource. For example, UE 101 may request the application from an "app store" or other repository, the application may be pushed to UE 101 (e.g., as part of an OTA update procedure), etc. UE 101 may further identify the token associated with the received application. For example, when installing the application, the token may be extracted from the application installation package and/or may otherwise be identified by UE 101.

Based on the identified token, UE 101 may identify a particular SSP associated with the application. For example, UE 101 may identify a particular SSP associated with the token based on the token-to-SSP mapping received (at 325). As noted above, this mapping may be maintained in a SIM card, a UICC, and/or other suitable storage device associated with UE 101. Additionally, or alternatively, UE 101 may output a request to authentication system 109 for an authorized SSP associated with the token after identifying the token received with the application (at 340).

UE 101 may accordingly store (at 345) information associating the application with the identified SSP. For example, the obtained application may include an application identifier, which may be a name of the application, a random or pseudorandom string, a hash of an application executable file, and/or some other suitable identifier. UE 101 may associate such identifier with the SSP that has been authorized for the application.

At some point, the application may output (at 350) traffic (e.g., destined for application server 103, where such traffic may include and/or may cause a session establishment request (e.g., a PDU session establishment request, an IP session establishment request, etc.), may include application traffic, and/or other outbound traffic. UE 101 may identify the SSP associated with the application, and may output the traffic to application server 103 (e.g., where the application may indicate the address of application server 103), along with an indication or request for the identified SSP to be applied to the traffic.

For example, as shown in FIG. 5, particular application 501 (e.g., referred to as "App_A") may have been identified (e.g., at 345) as being associated with or including a particular token, and UE 101 may further have identified (e.g., based on data structure 400) that this token is associated with a particular SSP (e.g., SSP_A). When application 501 outputs (at 502) outbound traffic, outputs a request to output outbound traffic, and/or requests a session to be established between UE 101 and application server 103, operating system ("OS") and/or kernel 503 (and/or some other suitable component of UE 101) may identify whether a particular SSP has been identified for application 501. For example, OS/kernel 503 may query or perform a lookup in a SIM card, UICC, etc. (e.g., UICC 504) based on an application identifier associated with application 501. In this example, UICC 504 may provide (at 504) information indicating that application 501 is associated with a particular SSP (e.g., SSP_A). Thus, prior to outputting the traffic, OS/kernel 503 may modify the traffic to include a request for SSP_A, and may output (at 506) the traffic with the request for SSP_A. For example, OS/kernel 503 may add header information indicating the requested SSP. Additionally, or alternatively, OS/kernel 503 may output a separate request (e.g., to one or more suitable components of network 107, such as to a User Plane Function ("UPF"), a Packet Data Network ("PDN") gateway ("PGW"), a SMF, a Serving Gateway ("SGW"), authentication system 109, and/or some other suitable device or system) to authorize UE 101 to communicate (e.g., with application server 103) according to the identified SSP_A.

Returning to FIG. 3, authentication system 109 may verify (at 355) an association between application server 103 and the requested SSP. As similarly described above, authentication system 109 may allow and/or reject (at 360) the traffic with the requested SSP, which may include facilitating or performing a session establishment between application server 103 and UE 101 according to the requested SSP and/or forwarding the outbound traffic to application server 103 according to the requested SSP if authentication system 109 has verified (at 355) that application server 103 is authorized for the requested SSP. On the other hand, as also discussed above, authentication system 109 may drop the traffic, apply a different SSP (e.g., a "default" SSP, a "best effort" SSP, etc., which may be different from the requested SSP), and/or perform other suitable operations when determining (at 355) that application server 103 is not authorized for the requested SSP.

Figure 6:
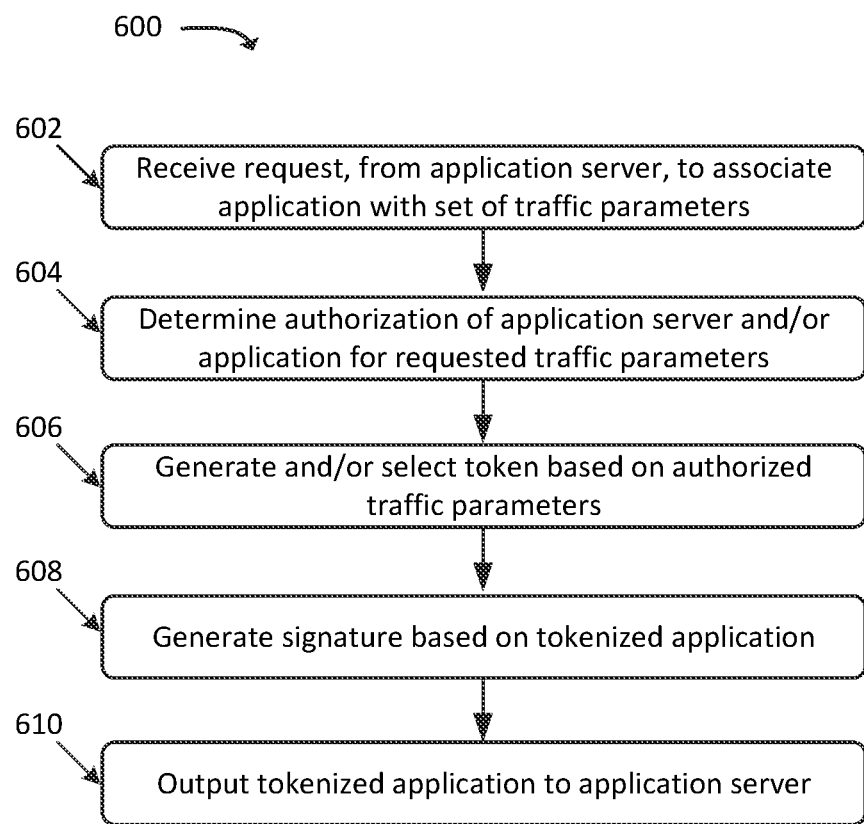
FIG. 6 illustrates an example process for authorizing a particular application and application server for a given set of traffic parameters, in accordance with some embodiments.

FIG. 6 illustrates an example process 600 for authorizing a particular application and application server 103 for a given set of traffic parameters (e.g., a particular SSP, a particular QoS level, a particular routing policy, etc.). In some embodiments, some or all of process 600 may be performed by authentication system 109. In some embodiments, one or more other devices may perform some or all of process 600 (e.g., in concert with, and/or in lieu of, authentication system 109).

As shown, process 600 may include receiving (at 602) a request, from application server 103, to associate a particular application with a particular set of traffic parameters. For example, authentication system 109 may receive an onboarding request from a particular application server 103 to authorize a particular application for a particular SSP, a particular QoS level, etc. In some embodiments, the request may include an identifier of the application, an application installation package, an application executable file, and/or other suitable information associated with the application. In some embodiments, the onboarding request may specify a particular set of traffic parameters.

Process 600 may further include determining (at 604) that application server 103 and/or the application are authorized for the requested traffic parameters. For example, authentication system 109 may maintain information correlating particular application servers 103 and/or applications to particular sets of traffic parameters. Such information may be received from, for example, a Home Subscriber Server ("HSS"), a Unified Data Management function ("UDM"), or some other source. In some embodiments, the request (at 602) may not include a requested set of traffic parameters, and authentication system 109 may identify the authorized traffic parameters for the application and/or for application server 103 based on information received from an HSS, a UDM, or some other source. In other words, the request (at 602) may include both a query for an authorized set of traffic parameters for a given application server 103 and/or application, as well as an authorization request for such traffic parameters.

Process 600 may additionally include generating and/or selecting (at 606) a token based on the authorized set of traffic parameters. For example, as discussed above, authentication system 109 may generate a token that is unique to the application and/or to application server 103, and/or may select a token from a pool of tokens that are each associated with a particular set of traffic parameters. Thus, the selected and/or generated token may indicate and/or otherwise be associated with the authorized traffic parameters for application server 103 and/or for the application.

In some embodiments, generating and/or selecting (at 606) the token may include maintaining information associating the token with the application. As discussed above, for example, authentication system 109 may store mapping information associating the application (e.g., the application identifier, an application install package, etc.) with the token. Additionally, or alternatively, authentication system 109 may regenerate, recompile, etc. the application (e.g., the application install package, one or more application executable files, etc.) with the token, such that the token is embedded or otherwise included in the application. The association of the token with the application and/or the compiling and/or generating of the application with the token may be referred to herein as a "tokenized application."

Process 600 may also include generating (at 608) a signature based on the tokenized application. For example, as discussed above, authentication system 109 may perform a hashing function and/or other suitable function on the tokenized application to identify a signature associated with the tokenized application. As discussed above, this signature may be used to verify that an application, as provided by application server 103 to one or more UEs 101, is provided with the authorized token (e.g., as opposed to being provided with another token indicating a non-authorized set of traffic parameters).

Process 600 may further include outputting (at 610) the tokenized application to application server 103. Application server 103 may proceed to make the tokenized application available for download to one or more UEs 101. Additionally, or alternatively, authentication system 109 may provide the tokenized application to a third party system, such as a repository from which the tokenized application may be obtained by one or more UEs 101. Such repository may include an "app store" or other similar resource. When provided by authentication system 109, such tokenized application may be "certified," where certification indicates that the traffic parameters associated with the tokenized application have been authorized by authentication system 109. In some embodiments, the third party system may be a system to which application server 103 does not have the ability or access to modify the tokenized application, and/or where such access or modification may remove the certification. In some embodiments, when the certification is removed and/or when the tokenized application is otherwise modified or invalidated, authentication system 109 may revoke the authorization for the application and/or application server 103 (e.g., as determined at 604).

Figure 7:
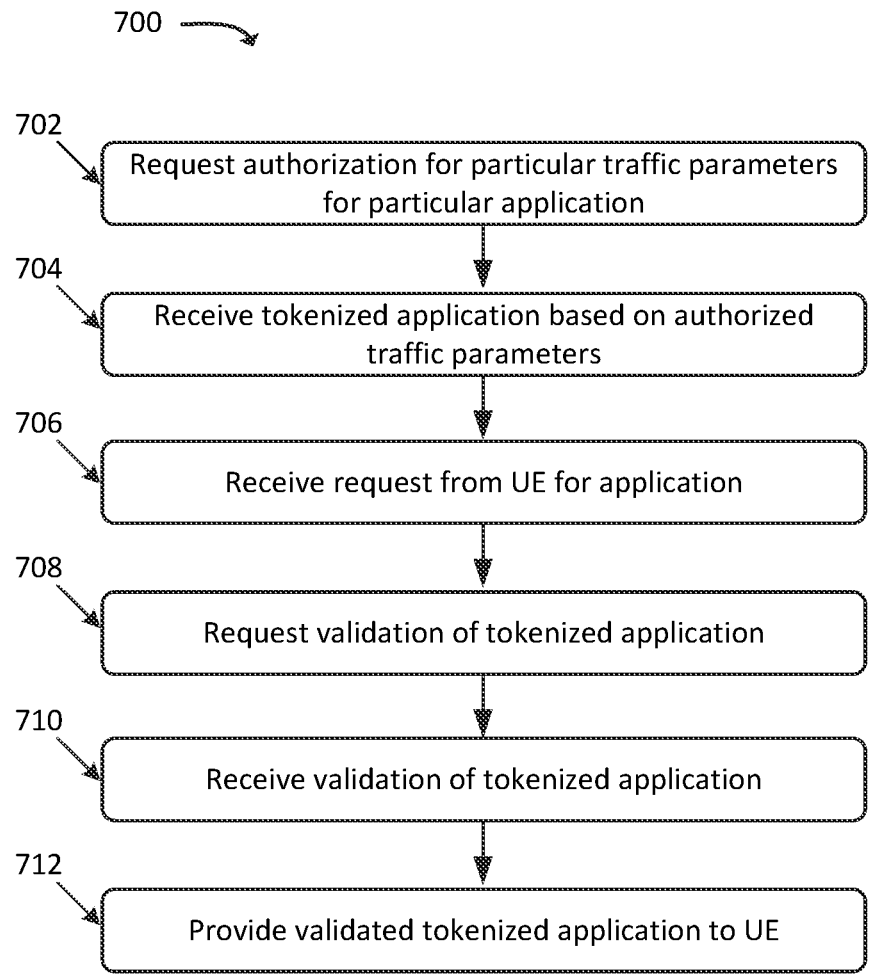
FIG. 7 illustrates an example process for obtaining authorization for a particular set of traffic parameters for a particular application, in accordance with some embodiments.

FIG. 7 illustrates an example process 700 for obtaining authorization for a particular set of traffic parameters for a particular application. In some embodiments, some or all of process 700 may be performed by application server 103. In some embodiments, one or more other devices may perform some or all of process 700 in concert with, and/or in lieu of, application server 103.

As shown, process 700 may include requesting (at 702) authorization for a particular set of traffic parameters for a particular application. For example, application server 103 may output a request to authentication system 109, indicating a requested set of traffic parameters for a given application hosted by application server 103. Additionally, or alternatively, application server 103 may provide information associated with the application (e.g., an application identifier, an application install package, etc.) without indicating a set of requested traffic parameters. For example, application server 103 may query authentication system 109 for the requested traffic parameters associated with the application.

Process 700 may further include receiving (at 704) a tokenized version of the application, based on the traffic parameters authorized (e.g., by authentication system 109) for the application. For example, as discussed above, the tokenized application may include a modified install package, application executable file, etc. that includes a token that is associated with the authorized traffic parameters. Additionally, or alternatively, as discussed above, the tokenized application may have been provided to a third party system. In such embodiments, application server 103 may receive a link (e.g., a URL, an IP address, and/or some other type of locator) to the tokenized application.

Process 700 may additionally include receiving (at 706) a request for the application from a given UE 101. For example, UE 101 may request to "download" the particular application.

Process 700 may also include requesting (at 708) validation of the tokenized application. For example, as discussed above, authentication system 109 may provide the tokenized application to authentication system 109, which may validate the tokenized application by generating a signature based on the tokenized application and comparing the signature to a previously generated signature for the tokenized application. In this manner, authentication system 109 may verify that the token and/or traffic parameters for the application, to be provided to UE 101, do not deviate from the authorized token and/or traffic parameters. In some embodiments, the validation (at 708) may be performed after and/or based on the request (at 706) for the application. In some embodiments, the validation (at 708) may be performed independently of any such requests.

Process 700 may further include receiving (at 710) an indication of the validation of the tokenized application. For example, authentication system 109 may indicate that the tokenized application is valid (e.g., the token included in or associated with the application matches the authorized token), based on comparing a signature associated with the tokenized application (as included in the request at 708) to a previously generated signature associated with the tokenized application.

Process 700 may additionally include providing (at 712) the validated tokenized application to UE 101. For example, application server 103, an "app store," and/or some other source may provide the validated tokenized application to UE 101. In some embodiments, the validation (at 710) of the tokenized application may be a requirement and/or precondition of the application being available from application server 103, the "app store," and/or other suitable resource. Once the tokenized application is received by UE 101, UE 101 may use the token to identify and implement the authorized traffic parameters associated with the application, without indicating the identity of the application to a network via which the traffic is sent.

Figure 8:
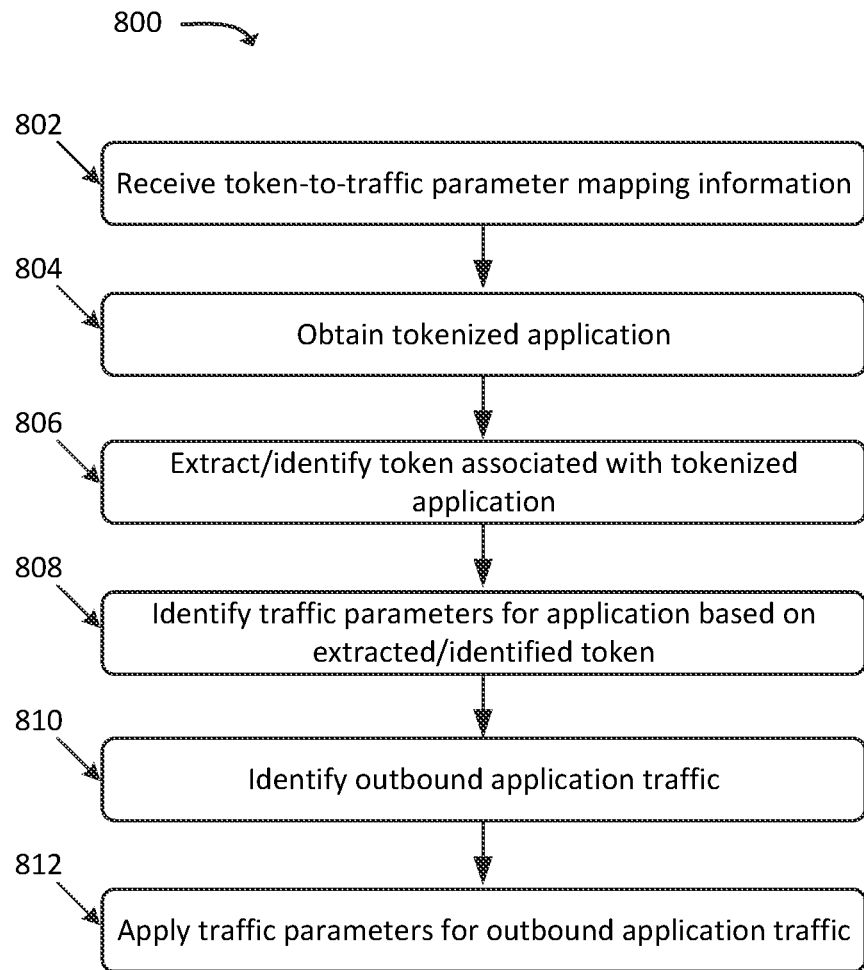
FIG. 8 illustrates an example process for identifying and implementing authorized traffic parameters associated with an application, in accordance with some embodiments.

For example, FIG. 8 illustrates an example process 800 for identifying and implementing the authorized traffic parameters associated with an application, without indicating the identity of the application to a network via which the traffic is sent. In some embodiments, some or all of process 800 may be performed by UE 101. In some embodiments, one or more other devices may perform some or all of process 800 in concert with, and/or in lieu of, UE 101.

As shown, process 800 may include receiving (at 802) token-to-traffic parameter mapping information. For example, UE 101 may receive, from authentication system 109 and/or some other source, information associating particular traffic parameters (e.g., SSPs, QoS levels, or the like) to particular tokens. In some embodiments, such information may be "pushed" to UE 101, such as part of an OTA process and/or some other procedure which may not necessarily be dependent on the installation of any given application. In some embodiments, UE 101 may store the token-to-traffic parameter mapping information in a SIM card, a UICC, and/or some other storage device associated with UE 101. In some embodiments, UE 101 may "protect" such information from modification or access by applications or users, such that the token-to-traffic parameter mapping may not be changed other than by OS/kernel 503 or other suitable component of UE 101.

Process 800 may further include obtaining (at 804) a tokenized application. For example, UE 101 may download a given application (e.g., an install package, an application executable file, etc.) from application server 103, an "app store," or other suitable resource. In some embodiments, the application may be "pushed" to UE 101 (e.g., as part of an OTA update procedure, a provisioning procedure, and/or some other suitable procedure). From the standpoint of UE 101 and/or a user of UE 101, obtaining the tokenized application may not be a different procedure than obtaining other applications that are not tokenized in the manner described above. For example, UE 101 may obtain two applications from an "app store" using the same or a similar procedure (e.g., clicking an "install" button, a "download" button, etc.), where one application is tokenized (e.g., includes a token in accordance with embodiments described herein, such as an embedded token) while another application is not tokenized (e.g., does not include a token).

Process 800 may additionally include extracting and/or identifying (at 806) a token associated with the application. For example, an application install package may include the token, the installation of the application may include extracting the token, and/or the token may be extracted and/or identified in some other suitable manner.

Process 800 may also include identifying (at 808) traffic parameters for the application based on the extracted and/or identified token. For example, UE 101 may perform a lookup in the token-to-traffic parameter mapping (received at 802) to identify a particular set of traffic parameters associated with the application. Additionally, or alternatively, UE 101 may query authentication system 109 and/or some other suitable device or system with the token, and may receive the particular set of traffic parameters in response to the query. In some embodiments, the query may additionally, or alternatively, include an identifier of the application, based on which authentication system 109 may identify the authorized set of traffic parameters.

Process 800 may further include identifying (at 810) outbound application traffic associated with the application. For example, OS/kernel 503, a modem, and/or some other component of UE 101 that handles the egress of traffic from UE 101 may identify traffic that has been generated and/or output by the application and is to be output from UE 101. For example, the application may make an API call to OS/kernel 503 to output traffic.

Process 800 may additionally include applying (at 812) the traffic parameters to the outbound application traffic. For example, UE 101 (e.g., OS/kernel 503) may add header information to the traffic indicating the traffic parameters and/or may otherwise modify the traffic based on the traffic parameters.

Figure 9:
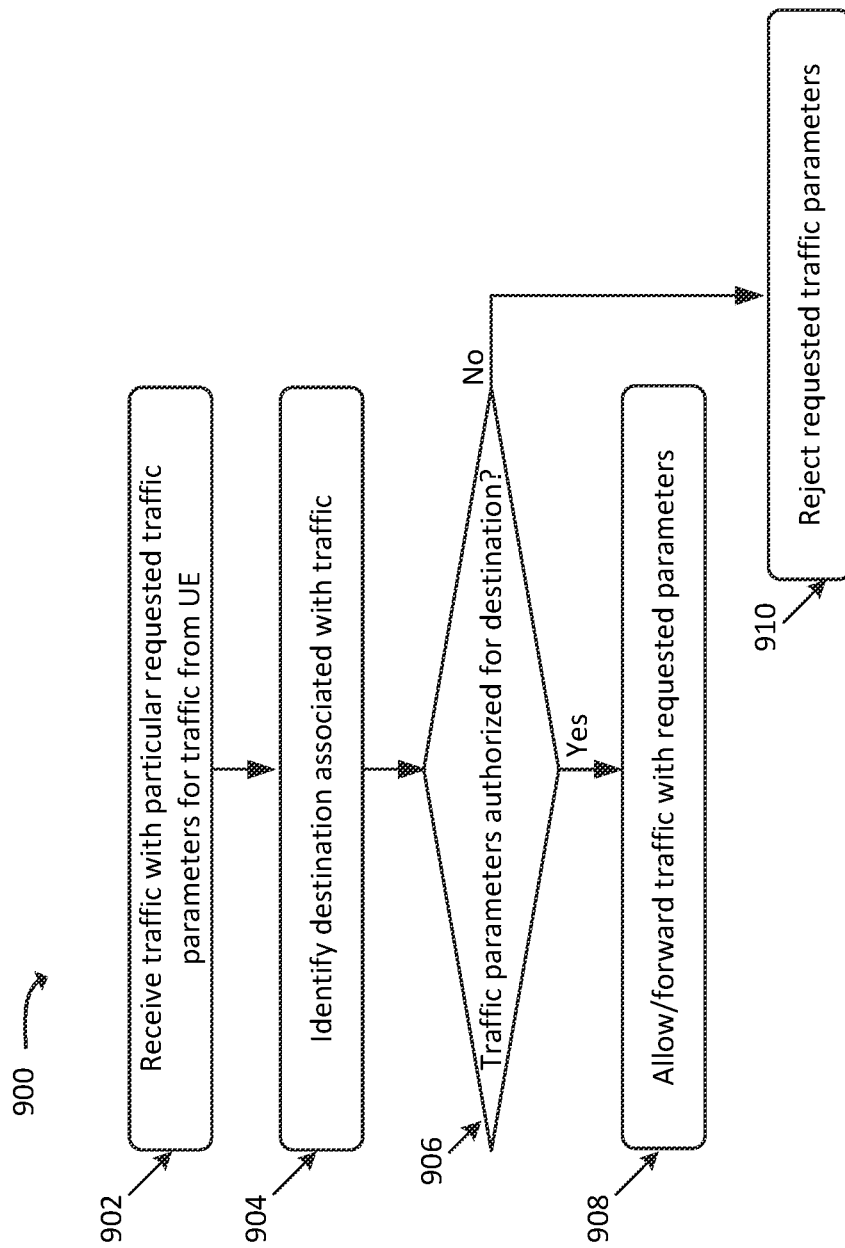
FIG. 9 illustrates an example process for authorizing and/or rejecting traffic with particular traffic parameters based on authorized parameters for a destination of the traffic, in accordance with some embodiments.

FIG. 9 illustrates an example process 900 for authorizing and/or rejecting traffic with particular traffic parameters based on authorized parameters for a destination of the traffic. In some embodiments, some or all of process 900 may be performed by authentication system 109. In some embodiments, one or more other devices may perform some or all of process 900 in concert with, and/or in lieu of, authentication system 109. For example, as discussed above, an SGW, a UPF, a PGW, a router, and/or some other network component that routes, forwards, and/or otherwise handles traffic may perform some or all of process 900 in concert with authentication system 109.

As shown, process 900 may include receiving (at 902) traffic with particular requested traffic parameters from UE 101. For example, as discussed above, the received traffic may include header information and/or may otherwise indicate a requested SSP, network slice, QoS level, routing policy, and/or other traffic parameters. As further discussed above, such traffic parameters may have been added by UE 101 (e.g., OS/kernel 503) based on a set of traffic parameters identified by UE 101 as being associated with a particular application. The received (at 902) traffic may, in some embodiments, not include an identifier of the particular application. In this manner, the usage of the particular application may be considered as being "anonymous" with respect to authentication system 109.

Process 900 may further include identifying (at 904) a destination associated with the traffic. For example, authentication system 109 may identify an IP address, a URL, an FQDN, and/or other identifier based on header information or other suitable information associated with the traffic.

Process 900 may additionally include determining (at 906) whether the requested traffic parameters are authorized for the destination. For example, as discussed above, authentication system 109 may determine whether application server 103, to which the traffic is destined, has been authorized for the requested traffic parameters (e.g., based on an "onboarding" or other similar process, as discussed above).

If the destination has been authorized for the requested traffic parameters (at 906—YES), then process 900 may also include allowing and/or forwarding (at 908) the traffic with the requested parameters. For example, authentication system 109 may apply a requested SSP to the traffic, forward the traffic via a requested network slice, add header information indicating an authorized QoS level, or the like. Additionally, or alternatively, authentication system 109 may output an indication to another network device (e.g., to an SGW, PGW, UPF, router, and/or other network device) that the traffic has been authorized for the requested traffic parameters, where such network device may in turn apply the traffic parameters.

If, on the other hand, the destination has not been authorized for the requested traffic parameters (at 906—NO), then process 900 may further include rejecting (at 910) the requested traffic parameters. For example, as discussed above, authentication system 109 may drop the traffic, and/or may forward or otherwise process the traffic with a set of parameters that may be different from the requested parameters. For example, authentication system 109 may apply "default" parameters to the traffic. As similarly discussed above, authentication system 109 may provide an indication to one or more network devices that the requested parameters have not been approved, and/or may otherwise forward the traffic without applying the requested traffic parameters.

Figure 10:
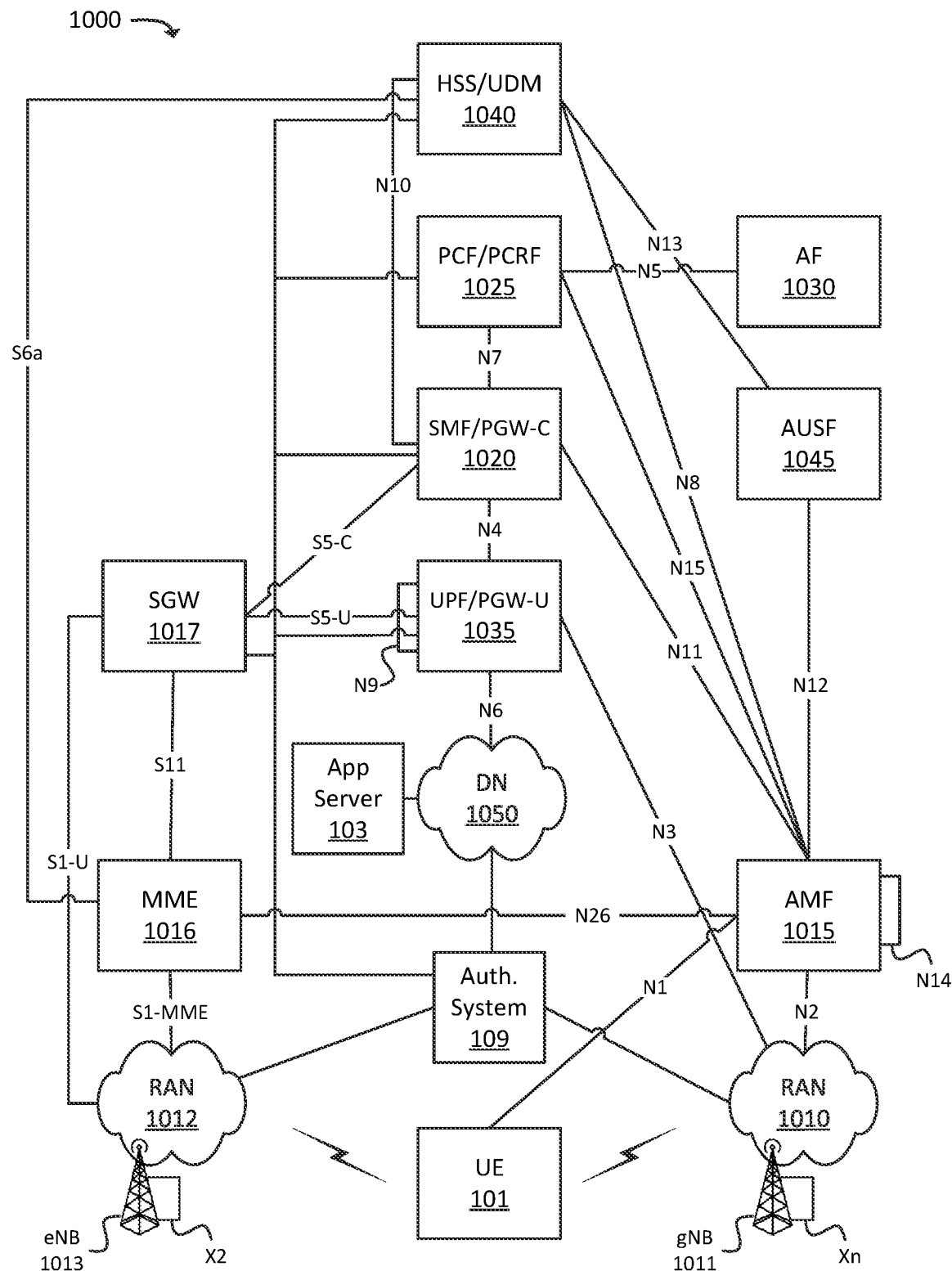
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G RAT may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 101, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, SGW 1017, Session Management Function SMF/PGW-Control plane function ("PGW-C") 1020, Policy Control Function ("PCF")/Policy Charging and Rules Function ("PCRF") 1025, Application Function ("AF") 1030, UPF/PGW-User plane function ("PGW-U") 1035, HSS/UDM 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as application server 103 and/or authentication system 109.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 101 may include a computation and communication device, such as a wireless mobile communication device that is capable of communicating with RAN 1010, RAN 1012, and/or DN 1050. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 101 may communicate with one or more other elements of environment 1000. UE 101 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 101 via the air interface, and may communicate the traffic to UPF/PGW-U 1035, and/or one or more other devices or networks. Similarly, RAN 1010 may receive traffic intended for UE 101 (e.g., from UPF/PGW-U 1035, AMF 1015, and/or one or more other devices or networks) and may communicate the traffic to UE 101 via the air interface.

RAN 1012 may be, or may include, a LTE RAN that includes one or more base stations (e.g., one or more eNBs 1013), via which UE 101 may communicate with one or more other elements of environment 1000. UE 101 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 101 via the air interface, and may communicate the traffic to UPF/PGW-U 1035, and/or one or more other devices or networks. Similarly, RAN 1010 may receive traffic intended for UE 101 (e.g., from UPF/PGW-U 1035, SGW 1017, and/or one or more other devices or networks) and may communicate the traffic to UE 101 via the air interface.

AMF 1015 may include one or more devices, systems, VNFs, etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 101. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 101, from DN 1050, and may forward the user plane data toward UE 101 (e.g., via RAN 1010, SMF/PGW-C 1020, and/or one or more other devices). In some embodiments, multiple UPFs 1035 may be deployed (e.g., in different geographical locations), and the delivery of content to UE 101 may be coordinated via the N9 interface (e.g., as denoted in FIG. 10 by the line marked "N9" originating and terminating at UPF/PGW-U 1035). Similarly, UPF/PGW-U 1035 may receive traffic from UE 101 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 101.

DN 1050 may include one or more wired and/or wireless networks. For example, DN 1050 may include an Internet Protocol IP-based PDN, a wide area network ("WAN") such as the Internet, a private enterprise network, and/or one or more other networks. UE 101 may communicate, through DN 1050, with data servers, other UEs 101, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 101 may communicate.

Application server 103 may include one or more devices, systems, VNFs, or the like, which perform one or more operations described herein. Although referred to as an "application server," in practice, the same or similar operations described with respect to application server 103 may be performed by some other type of device or system, such as a content provider system, a cloud computing system, or the like. Application server 103 may host a server side of one or more applications, where a client side of such applications may be provided to and/or executed by one or more UEs 101. For example, application server 103 may receive traffic from UE 101, perform operations based on the traffic, and output further traffic to UE 101 based on the operations.

Authentication system 109 may include one or more devices, systems, VNFs, or the like, which perform one or more operations described herein. For example, authentication system 109 may authorize particular applications and/or application servers 103 for particular traffic parameters, such as network slicing parameters, QoS parameters, or the like. Authentication system 109 may maintain information correlating particular application servers 103 to particular sets of parameters, and may provide tokenized versions of appropriate applications to application server 103 and/or other device or system for distribution to one or more UEs 101. Authentication system 109 may further determine whether traffic, output by UEs 101 with particular traffic parameters, is authorized for the traffic parameters indicated in such traffic. Authentication system 109 may communicate with one or more other devices, systems, or VNFs to indicate the authorization or rejection of certain traffic parameters with respect to traffic from one or more UEs 101, where such other devices, systems, or VNFs may implement such parameters.

Figure 11:
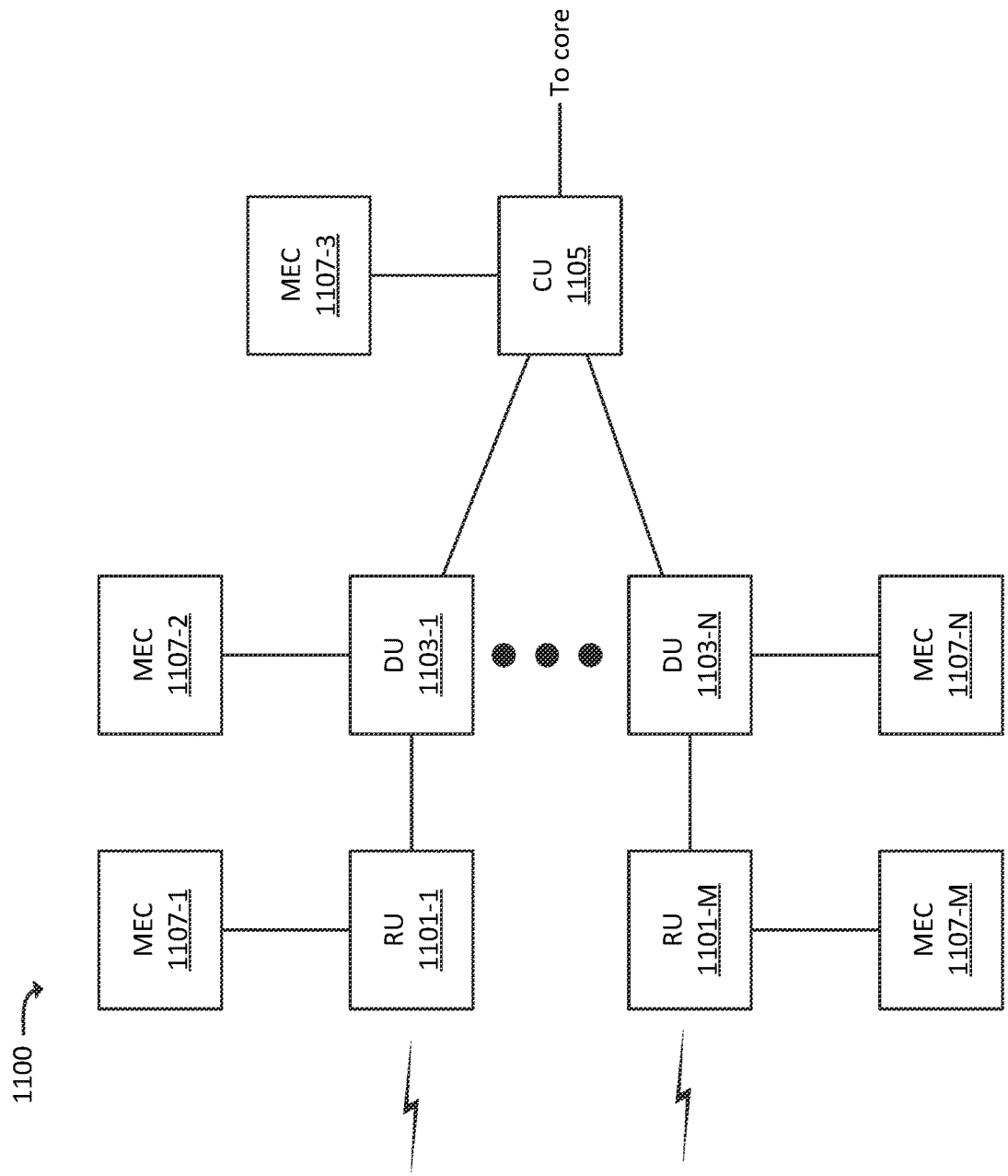
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 101 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 101, and may determine which DU(s) 1103 should receive the downlink traffic. DU 1103 may include one or more devices that transmit traffic between a core network (e.g., via CU 1105) and UE 101 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 101.

RU 1101 may include hardware circuitry (e.g., one or more RF transceivers, antennas, radios, and/or other suitable hardware) to communicate wirelessly (e.g., via an RF interface) with one or more UEs 101, one or more other DUs 1103 (e.g., via RUs 1101 associated with DUs 1103), and/or any other suitable type of device. In the uplink direction, RU 1101 may receive traffic from UE 101 and/or another DU 1103 via the RF interface and may provide the traffic to DU 1103. In the downlink direction, RU 1101 may receive traffic from DU 1103, and may provide the traffic to UE 101 and/or another DU 1103.

RUs 1101 may, in some embodiments, be communicatively coupled to one or more Multi-Access/Mobile Edge Computing ("MEC") devices, referred to sometimes herein simply as "MECs" 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 101, via a respective RU 1101.

For example, RU 1101-1 may route some traffic, from UE 101, to MEC 1107-1 instead of to a core network (e.g., via DU 1103 and CU 1105). MEC 1107-1 may process the traffic, perform one or more computations based on the received traffic, and may provide traffic to UE 101 via RU 1101-1. In this manner, ultra-low latency services may be provided to UE 101, as traffic does not need to traverse DU 1103, CU 1105, and an intervening backhaul network between DU network 1100 and the core network. In some embodiments, MEC 1107 may include, and/or may implement, some or all of the functionality described above with respect to authentication system 109.

Figure 12:
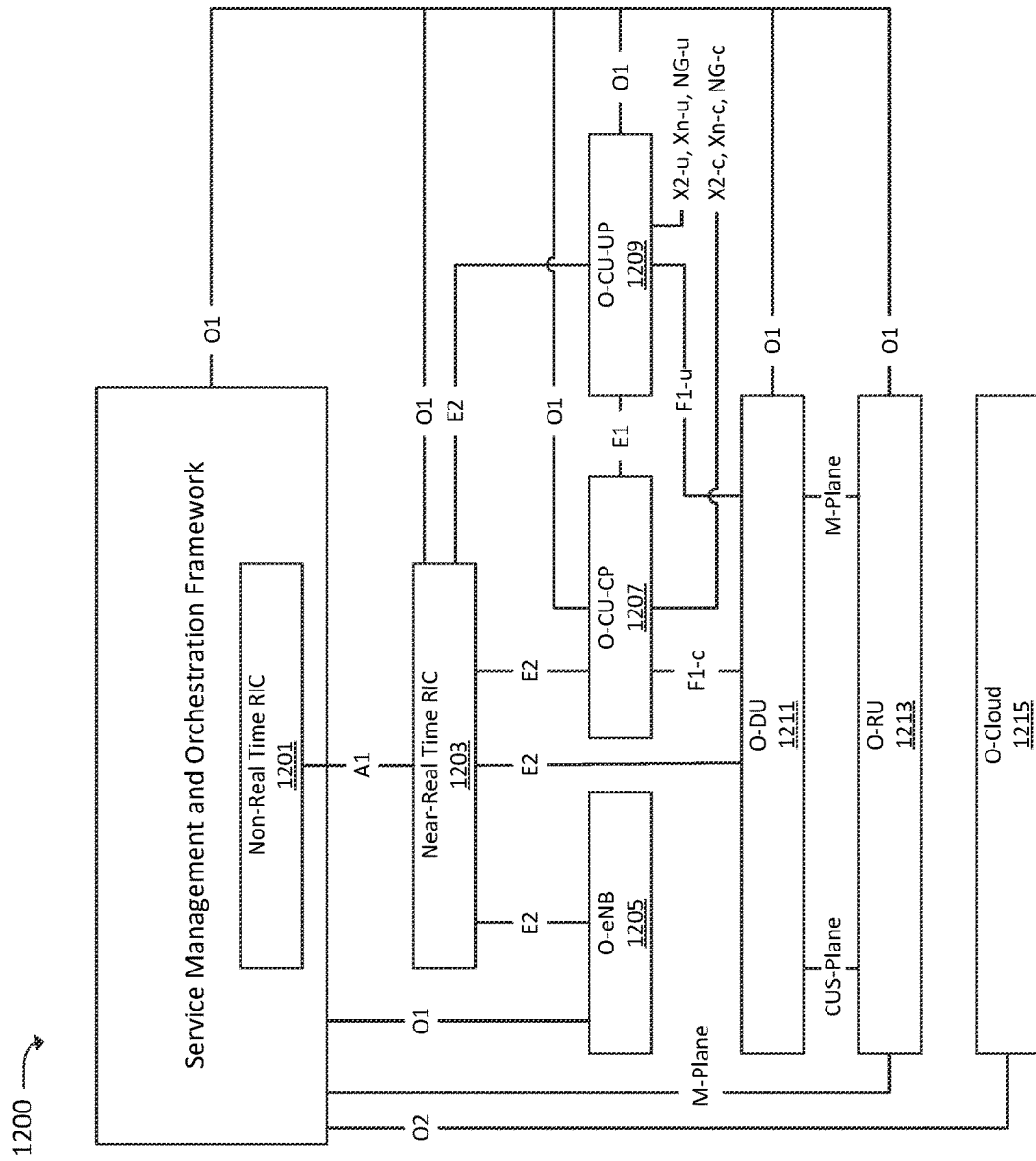
FIG. 12 illustrates an example arrangement of an Open RAN ("O-RAN") environment in which one or more embodiments, described herein, may be implemented.

FIG. 12 illustrates an example O-RAN environment 1200, which may correspond to RAN 1010, RAN 1012, and/or DU network 1100. For example, RAN 1010, RAN 1012, and/or DU network 1100 may include one or more instances of O-RAN environment 1200, and/or one or more instances of O-RAN environment 1200 may implement RAN 1010, RAN 1012, DU network 1100, and/or some portion thereof. As shown, O-RAN environment 1200 may include Non-Real Time Radio Intelligent Controller ("RIC") 1201, Near-Real Time RIC 1203, O-eNB 1205, O-CU-Control Plane ("O-CU-CP") 1207, O-CU-User Plane ("O-CU-UP") 1209, O-DU 1211, O-RU 1213, and O-Cloud 1215. In some embodiments, O-RAN environment 1200 may include additional, fewer, different, and/or differently arranged components.

In some embodiments, some or all of the elements of O-RAN environment 1200 may be implemented by one or more configurable or provisionable resources, such as virtual machines, cloud computing systems, physical servers, and/or other types of configurable or provisionable resources. In some embodiments, some or all of O-RAN environment 1200 may be implemented by, and/or communicatively coupled to, one or more MECs 1107.

Non-Real Time RIC 1201 and Near-Real Time RIC 1203 may receive performance information (and/or other types of information) from one or more sources, and may configure other elements of O-RAN environment 1200 based on such performance or other information. For example, Near-Real Time RIC 1203 may receive performance information, via one or more E2 interfaces, from O-eNB 1205, O-CU-CP 1207, and/or O-CU-UP 1209, and may modify parameters associated with O-eNB 1205, O-CU-CP 1207, and/or O-CU-UP 1209 based on such performance information. Similarly, Non-Real Time RIC 1201 may receive performance information associated with O-eNB 1205, O-CU-CP 1207, O-CU-UP 1209, and/or one or more other elements of O-RAN environment 1200 and may utilize machine learning and/or other higher level computing or processing to determine modifications to the configuration of O-eNB 1205, O-CU-CP 1207, O-CU-UP 1209, and/or other elements of O-RAN environment 1200. In some embodiments, Non-Real Time RIC 1201 may generate machine learning models based on performance information associated with O-RAN environment 1200 or other sources, and may provide such models to Near-Real Time RIC 1203 for implementation.

O-eNB 1205 may perform functions similar to those described above with respect to eNB 1013. For example, O-eNB 1205 may facilitate wireless communications between UE 101 and a core network. O-CU-CP 1207 may perform control plane signaling to coordinate the aggregation and/or distribution of traffic via one or more DUs 1103, which may include and/or be implemented by one or more O-DUs 1211, and O-CU-UP 1209 may perform the aggregation and/or distribution of traffic via such DUs 1103 (e.g., O-DUs 1211). O-DU 1211 may be communicatively coupled to one or more RUs 1101, which may include and/or may be implemented by one or more O-RUs 1213. In some embodiments, O-Cloud 1215 may include or be implemented by one or more MECs 1107, which may provide services, and may be communicatively coupled, to O-CU-CP 1207, O-CU-UP 1209, O-DU 1211, and/or O-RU 1213 (e.g., via an O1 and/or O2 interface).

Figure 13:
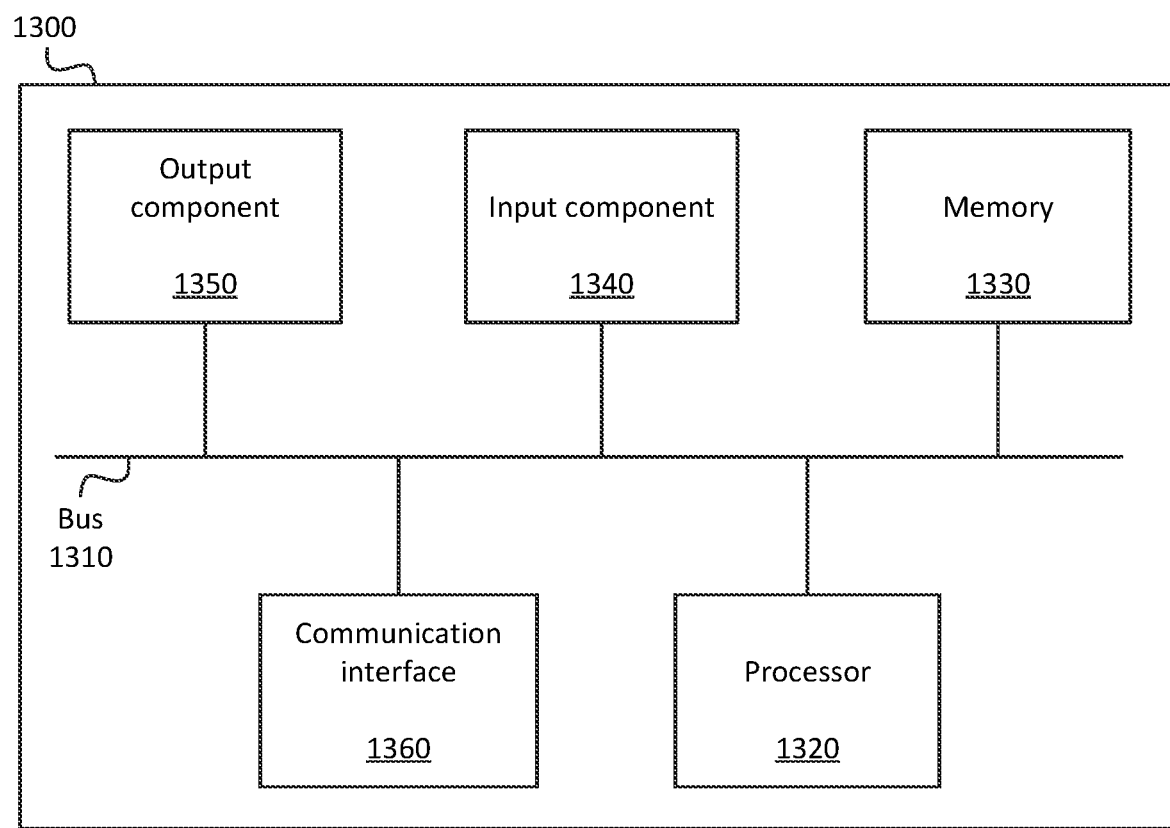
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
   one or more processors configured to:

identify a particular set of traffic parameters for which
   a particular application is authorized;
associate a particular device, associated with the par-
   ticular application, with the particular set of traffic
   parameters based on identifying the authorization of
   the particular application for the particular set of
   traffic parameters;
output, to a User Equipment ("UE"), a plurality of
   tokens that are associated with a plurality of sets of
   traffic parameters,
   wherein the UE identifies, prior to outputting traffic
      that is destined for the particular device, that the
      traffic is associated with a particular token of the
      plurality of tokens, and
   wherein the UE selects the particular set of traffic
      parameters from a plurality of candidate sets of
      traffic parameters based on the particular token
      associated with the traffic;
receive, from the UE, the traffic that is destined for the
   particular device, wherein the traffic is associated
   with a request for the particular set of traffic param-
   eters;
determine, based on the received traffic, that the par-
   ticular device is authorized for the particular set of
   traffic parameters; and
forward the traffic to the particular device based on
   determining that the particular device is authorized
   for the particular set of traffic parameters.

2. The device of claim 1, wherein the request for the particular set of traffic parameters is based on the selection of the particular set of traffic parameters from the plurality of candidate sets of traffic parameters.

3. The device of claim 1, wherein the one or more processors are further configured to output the particular token to the particular device,
   wherein the particular device provides the particular token to the UE with a particular application, and
   wherein the identifying, by the UE, that the traffic is associated with the particular token includes identifying that the particular application is associated with the particular token.

4. The device of claim 1, wherein the particular set of traffic parameters include at least one of:
   a particular network slice, or
   a particular Quality of Service ("QoS") level.

5. A device, comprising:
one or more processors configured to:
   identify a first set of traffic parameters for which a
      particular application is authorized;
   associate a particular device, associated with the par-
      ticular application, with the first set of traffic param-
      eters based on identifying the authorization of the
      particular application for the first set of traffic param-
      eters;
   receive, from a User Equipment ("UE"), first traffic that
      is destined for the particular device, wherein the first
      traffic is associated with a request for the first set of
      traffic parameters;
   determine, based on the received first traffic, that the
      particular device is authorized for the first set of
      traffic parameters; and
   forward the first traffic to the particular device based on
      determining that the particular device is authorized
      for the first set of traffic parameters;
   receive, from the UE, second traffic that is destined for
      the particular device, wherein the second traffic is
      associated with a request for a second set of traffic
      parameters;
   determine, based on the received second traffic, that the
      particular device is not authorized for the second set
      of traffic parameters; and
   reject the second traffic based on determining that the
      particular device is not authorized for the second set
      of traffic parameters.

6. The device of claim 5, wherein the first set of traffic parameters include at least one of:
   a particular network slice, or
   a particular Quality of Service ("QoS") level.

7. A device, comprising:
one or more processors configured to:
   identify a particular set of traffic parameters for which
      a particular application is authorized;
   associate a particular device, associated with the par-
      ticular application, with the particular set of traffic
      parameters based on identifying the authorization of
      the particular application for the particular set of
      traffic parameters;
   provide a token to the particular device based on
      associating the particular device with the particular
      set of traffic parameters;
   validate that an application install package, associated
      with the particular application, includes the token
      prior to the application install package being avail-
      able to a User Equipment ("UE");
   receive, from the UE, traffic that is destined for the
      particular device, wherein the traffic is associated
      with a request for the particular set of traffic param-
      eters;
   determine, based on the received traffic, that the par-
      ticular device is authorized for the particular set of
      traffic parameters; and
   forward the traffic to the particular device based on
      determining that the particular device is authorized
      for the particular set of traffic parameters.

8. The device of claim 7, wherein the particular set of traffic parameters include at least one of:
   a particular network slice, or
   a particular Quality of Service ("QoS") level.

9. The device of claim 7, wherein the UE identifies, prior to outputting the traffic, that the traffic is associated with a particular token of the plurality of tokens, and
   wherein the UE selects the particular set of traffic param-
      eters from a plurality of candidate sets of traffic param-
      eters based on the particular token associated with the
      traffic.

10. A non-transitory computer-readable medium, storing a plurality of processor-executable instructions to:
   identify a first set of traffic parameters for which a
      particular application is authorized;
   associate a particular device, associated with the particu-
      lar application, with the first set of traffic parameters
      based on identifying the authorization of the particular
      application for the first set of traffic parameters;
   receive, from a User Equipment ("UE"), first traffic that is
      destined for the particular device, wherein the first
      traffic is associated with a request for the first set of
      traffic parameters;
   determine, based on the received first traffic, that the
      particular device is authorized for the first set of traffic
      parameters;

forward the first traffic to the particular device based on determining that the particular device is authorized for the first set of traffic parameters;

receive, from the UE, second traffic that is destined for the particular device, wherein the second traffic is associated with a request for a second set of traffic parameters;

determine, based on the received second traffic, that the particular device is not authorized for the second set of traffic parameters; and reject the second traffic based on determining that the particular device is not authorized for the second set of traffic parameters.

11. The non-transitory computer-readable medium of claim 10, wherein the plurality of processor-executable instructions further include processor-executable instructions to output, to the UE, a plurality of tokens that are associated with a plurality of sets of traffic parameters, wherein the UE identifies, prior to outputting the first traffic, that the first traffic is associated with a particular token of the plurality of tokens, and wherein the UE selects the first set of traffic parameters from a plurality of candidate sets of traffic parameters based on the particular token associated with the first traffic.

12. The non-transitory computer-readable medium of claim 11, wherein the request for the particular set of traffic parameters is based on the selection of the first set of traffic parameters from the plurality of candidate sets of traffic parameters.

13. The non-transitory computer-readable medium of claim 11, wherein the plurality of processor-executable instructions further include processor-executable instructions to output the particular token to the particular device, wherein the particular device provides the particular token to the UE with a particular application, and wherein the identifying, by the UE, that the first traffic is associated with the particular token includes identifying that the particular application is associated with the particular token.

14. The non-transitory computer-readable medium of claim 10, wherein the first set of traffic parameters include at least one of:

a particular network slice, or a particular Quality of Service ("QoS") level.

15. The non-transitory computer-readable medium of claim 10, wherein the plurality of processor-executable instructions further include processor-executable instructions to:

provide a token to the particular device based on associating the particular device with the first set of traffic parameters; and validate that an application install package, associated with the particular application, includes the token prior to the application install package being available to the UE.

16. A method, comprising:

identifying a first set of traffic parameters for which a particular application is authorized;

associating a particular device, associated with the particular application, with the first set of traffic parameters based on identifying the authorization of the particular application for the first set of traffic parameters;

receiving, from a User Equipment ("UE"), first traffic that is destined for the particular device, wherein the first traffic is associated with a request for the first set of traffic parameters;

determining, based on the received first traffic, that the particular device is authorized for the first set of traffic parameters;

forwarding the first traffic to the particular device based on determining that the particular device is authorized for the first set of traffic parameters;

receiving, from the UE, second traffic that is destined for the particular device, wherein the second traffic is associated with a request for a second set of traffic parameters;

determining, based on the received second traffic, that the particular device is not authorized for the second set of traffic parameters; and rejecting the second traffic based on determining that the particular device is not authorized for the second set of traffic parameters.

17. The method of claim 16, further comprising:

outputting, to the UE, a plurality of tokens that are associated with a plurality of sets of traffic parameters, wherein the UE identifies, prior to outputting the traffic, that the traffic is associated with a particular token of the plurality of tokens, and wherein the UE selects the first set of traffic parameters from a plurality of candidate sets of traffic parameters based on the particular token associated with the first traffic.

18. The method of claim 17, wherein the request for the first set of traffic parameters is based on the selection of the first set of traffic parameters from the plurality of candidate sets of traffic parameters.

19. The method of claim 17, further comprising:

outputting the particular token to the particular device, wherein the particular device provides the particular token to the UE with a particular application, and wherein the identifying, by the UE, that the first traffic is associated with the particular token includes identifying that the particular application is associated with the particular token.

20. The method of claim 16, further comprising:

providing a token to the particular device based on associating the particular device with the first set of traffic parameters; and validating that an application install package, associated with the particular application, includes the token prior to the application install package being available to the UE.

* * * * *